Nov. 25, 1969   E. T. JONES   3,479,939
STRIP FILM CAMERA AND METHOD OF OPERATING SAME
Filed Feb. 13, 1967
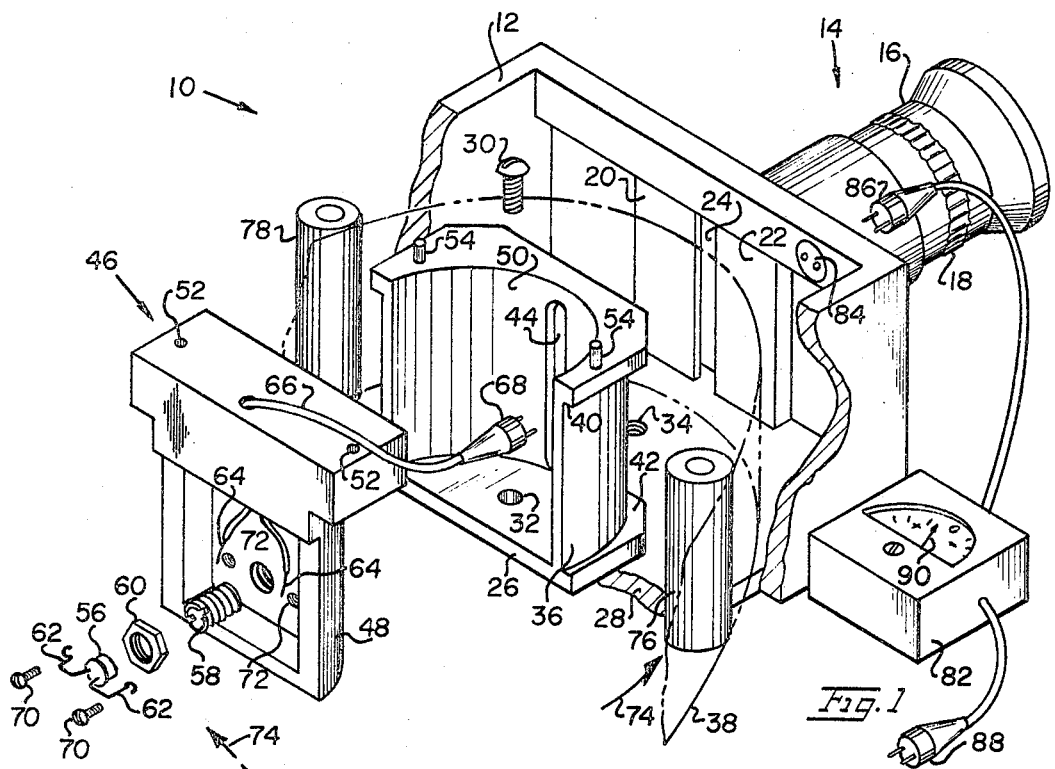
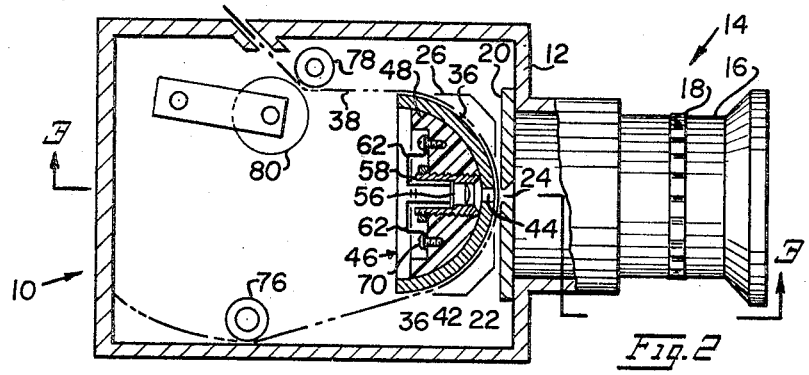
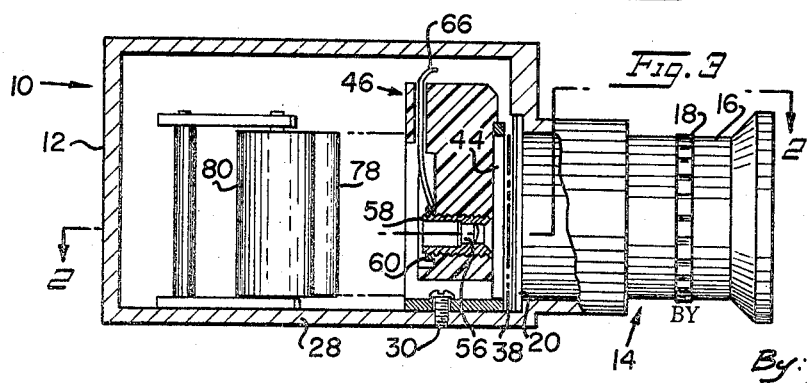
INVENTOR.
EMIL T. JONES
BY
ATTORNEY United States Patent Office 3,479,939
Patented Nov. 25, 1969

3,479,939
STRIP FILM CAMERA AND METHOD
OF OPERATING SAME
Emil T. Jones, Babylon, N.Y., assignor to Jones Precision Photo Finish, Inc., Westbury, N.Y., a corporation of New York
Filed Feb. 13, 1967, Ser. No. 615,492
Int. Cl. G03b 37/00, 29/00
U.S. Cl. 95—15        10 Claims

ABSTRACT OF THE DISCLOSURE

A photographic camera having a strip of film movable behind a lens and a light sensor that is positioned with respect to the strip of moving film to sense only the light that actually impinges upon and passes through the film. The method of operating the camera includes positioning the light sensor behind the strip of film to assure uniformity of exposure of the film as well as density of color in the print, in spite of variations of lighting conditions that may occur.

---

In prior art cameras it has been the practice to employ light sensing devices to sense the intensity of light passing into the objective through the lens and toward the film. In such cameras, the light sensing device or photocell is usually connected to an operating structure, as a meter or mechanical means that automatically adjusts the lens diaphragm of the objective to vary the light passing therethrough. Therefore, the extent of the operation of the meter or adjustment of the lens diaphragm is a function of the light that is sensed by the light sensing device before the light actually reaches the film. In consequence, whether the operating structure connected with and functioning in response to the light sensing device is a meter or a lens diaphragm adjustor, the same does not perform as a function of the light that actually impinges upon the film, but only upon the light sensing device. In prior art cameras, the light sensing means had been positioned remote from the film and out of the path of the light passing through the objective. Hence, it will be clear that such prior art cameras are incapable of sensing the light that actually impinges upon the film.

It is important for cameramen to be able to determine the intensity of light that actually impinges upon the film during all periods of operation, so that they may adjust the lens diaphragm to compensate for such light variations, or if adjustment of the diaphragm cannot be accomplished rapidly enough, so they may adequately compensate for such light changes in the development of the film. This problem is especially prevalent in the operation of motion picture or strip film cameras of the type exemplified by the United States Letters Patent to J. J. Jones, Ser. No. 2,482,621. When cameras are operated out of doors, light variations and changes occur so rapidly that it is important to be able to make equally rapid adjustments in the lens diaphragm or to compensate for them in the development of the film.

The desideratum of the present invention is to overcome the aforementioned problems of the prior art by providing a strip film camera in which only the light that actually impinges upon and exposes the film is sensed, and a method of operating the camera to assure uniformity of exposure of the film as well as density of color in the print, in spite of variations in lighting conditions that may occur.

Accordingly, another object of the invention is to provide a camera in which a strip of film is movable and in which light sensing means may be positioned with respect to the moving strip of film to sense the light that actually impinges upon and passes through such film.

Another object of the invention resides in the connection of operable means with the light sensing means, so that the latter will operate only in response to the light that is sensed thereby.

Other and further objects of this invention reside in the structures and arrangements hereinafter more fully described with reference to the accompanying drawings in which:

FIG. 1 is an expanded perspective view of a camera constructed according to the teaching of the invention;

FIG. 2 is a cross-section of FIG. 3 taken along lines 2—2 thereof, wherein the parts thereof are shown in their assembled relationship; and FIG. 3. is a cross-section of FIG. 2 taken along lines 3—3.

Referring now to the drawings, the camera thereshown is generally identified by the numeral 10. The camera 10 comprises a housing 12 which has fixedly mounted on its forward face an objective 14. The objective 14 may be of any desired configuration and details as is conventional in the art. However, the objective 14 includes the usual lens (not shown) and an adjustable iris diaphragm 16. The iris of diaphragm 16 is adapted to be adjusted rotatively. This may be accomplished by rotating the same at the knurled periphery 18. The details of the objective 14 and the adjustable iris diaphragm 16 are conventional and therefore form no part of the present invention.

Mounted within the interior of the housing 12 behind the objective 14 are a plurality of exposure adjustment blades 20 and 22. Each of the blades is adapted to be adjusted laterally toward and away from the other within the housing 12, to define an exposure opening 24, that is of a predetermined vertical height and is adjustable to a predetermined width or lateral spacing as control by the relative spacing of the blades 20 and 22. It will be noted that the exposure opening 24 is aligned with the axis of the objective 14 to enable light to penetrate therebeyond.

Mounted in the housing 12 behind the exposure opening 24 and its defining blades 20 and 22 is a curved gate or film guide 26. The film guide 26 is adapted to be securely mounted to the base 28 of the camera housing 12 by any suitable means, such as the screw 30 that is adapted to extend down through a suitable hole 32 provided in the base of the film guide 26 for threaded engagement with a tapped hole 34. It will be apparent that any other suitable mode of fastening the film guide 26 in the camera housing 12 will be equally acceptable.

The film guide 26 has a forward curved guide surface 36 along which a strip of film 38, shown in dot-dash lines, is guided for movement. To aid in this guiding function, the upper and lower limits of the guide surface 36 may terminate in film guide shoulders 40 and 42. These shoulders are spaced from each other a distance equal to and slightly in excess of the height of the film strip 38.

The film guide or curved gate 26 is provided with an aperture 44 that is positiond directly behind and in vertical alignment with the exposure opening 24. Although the aperture 44 is of constant dimension, in practice it has been found that the same may also be varied like that of the exposure opening, if desired. The aperture 44, like the exposure opening 24, is in direct alignment with the focal axis of the objective 14, so that light rays entering the objective 14 will pass through the exposure opening 24, and will also enter and pass through the aperture 44. It is noted that the film guide 26 has a hollow interior which conforms closely to the curved guide surface 36. This is to enable the mounting of a light sensing fixture, generally identified by the numeral 46, within the hollow confines of the guide 26 and to position it as closely as possible to the forward curved guide surface 36.

The light sensing fixture 46 is provided with a curved face 48 that fits snugly into engaging cooperation with the inner curved face 50 of the film guide 26. The fixture 46 is provided with a set of positioning openings 52 at it laterally opposed upper ends. These positioning openings 52 are adapted to receive supporting positioning pins 54 that are correspondingly positioned at laterally opposite portions on the upper side of the shoulder 40 of the film guide 26.

When the light sensing fixture 46 is positioned within the confines of the film guide 26, with its openings 52 mating with and receiving the positioning pins 54, the fixture will then be accurately located and held behind the aperture 44. This relationship is important since the fixture 46 supports a light sensing means or photocell 56 within its confines. The light sensing means may be a photocell of any suitable commercial construction and detail, and therefore the precise details of the same form no part of this invention.

The light sensing means 56 is mounted within a threaded adjustment element 58, which is adapted to be adjusted axially toward and away from the aperture 44. Inasmuch as the adjustment element 58 supports the sensing means 56, any rotation of the same within the fixture 46 will cause the light sensing means 56 to move toward and away from the aperture 44 for a purpose to be described. However, when properly positioned, the adjustment element 56 is able to be securely locked in place by the tightening of a lock nut 60.

The electrical leads 62 of the light sensing means 56 are connected with corresponding leads 64 of a line cord 66, which terminates in a suitable pronged plug 68. The leads 62 are connected to their respective leads 64 by convenient connecting means, such as the screws 70, that are adapted to be threaded into holes 72, provided in the rear of the fixture 46.

With the details of structure assembled as described, and in the manner as shown in FIGS. 2 and 3, a strip of film 38 is adapted to be moved through the camera housing 12 in the direction of the arrows 74. The film strip 38 is guided about a guide roller 76, between the exposure opening 24 and the light sensing means or photo cell 56. The movement of the film strip is guided between the shoulders 40 and 42 of the film guide, and along the curved guide surface 36, so that it is accurately positioned in location during its movement between the exposure opening 24, the aperture 44 and the light sensing means 56. The film 38 is also moved between a further guide roller 78 and a pressure roller 80, and then out of the housing 12 as shown in FIG. 2.

During such movement, the film is constantly exposed to light rays passing through the objective 14, and the exposure opening 24. In order to determine the intensity of light actually impinged upon and passing through the emulsion of the film, so as to activate the emulsion and produce an image thereon, the light sensing means 56 is positioned behind the film and within the confines of the aperture 44. In this way, the light passing through the film is diffused, and is sensed by the sensing means. By properly adjusting the axial position and location of the sensing means 56 toward and away from the film by rotation of the threaded element 58, it is possible to compensate for differences in emulsion characteristics of different films that may be utilized in the camera. This adjustment makes it possible to use different light meters having different calibrations with the light sensing means, since adjustment of the light sensing means axially toward and away from the film will compensate for the differences in such meters that may be utilized Although any operable means may be connected with the light sensing means to operate in response to the light sensed thereby, in practice, it has been found that the use of a light meter is convenient. For this reason, a light meter 82 is illustrated in the drawing. However, it will be recognized by those who are skilled in the art that the lens diaphragm 16 may be actuated mechanically in any desired manner in response to the sensing operation of the photocell 56. In connecting the meter 82 with the light sensing means 56, the light-tight housing 12 is povided with a female double-sided socket 84. The double socket 84 is adapted to electrically connect the line cord plug 68 with a similar line cord plug 86 of the meter 82. The meter may be suitably connected by a plug 88 with any desired source of electricity. In this way, the connection between the inside and the outside of the housing 12 may be made without affecting the light-tight character of the housing.

Before using the camera 10 the cameraman will predeterminately adjust the relative spacing of the blades 20 and 22 to enlarge or narrow the width of the exposure opening 24 or the field of view to which the frames of the film 38 will be exposed. This, in turn, affects the amount of light that will be permitted to impinge upon the film. As the strip of film 38 moves through the passageway between the exposure opening 24 and the aperture 44, the light penetrating the film emulsion is sensed by the sensing means 56. This is possible because the sensing photocell 56 is positioned within the viewing confines of the aperture 44 to view the light as it penetrates into the aperture.

The film strip 38 is maintained against the curved surface 36 during its movement. Hence, the film passageway defined between the curved surface 36 and the adjacent surfaces of the blades 20 and 22 is sufficiently wide to accommodate the film and enable its movement therebetween. Because it is desirable to be able to position the photocell 56 as close to the film strip as possible, it is located with respect to the film strip to sense the light penetrating therethrough from within the confines of the aperture. This then permits axial adjustment of the sensing means 56 with respect to the film strip by rotation of the adjustment element 58, so that its response and sensitivity to light rays penetrating the film can be varied and adjusted selectively.

When both the photocell plug 68 and the plug 86 are connected with each other at the socket 84 the operable meter means 82 will operate in response to the light sensed by the light sensing means or photocell 56. The meter may be operated by any suitable source of electricity. If the electrical source is other than batteries, the plug 88 may be connected with any convenient electrical wall outlet. As noted previously, the meter connected with the light sensing means is but one form of operable means that may be utilized. It is entirely possible and within the contemplation of this invention that the iris of the lens diaphragm 16 may be automatically operated to adjust the same in response to the light sensed by the photocell 56.

However, in the practice of the present invention, it has been found that when the camera 10 is utilized out of doors where lighting conditions are difficult to control and subject to change without notice, the automatic adjustment of the lens diaphragm is not satisfactory. It is especially important to have the lens diaphragm 16 properly adjusted to the prevailing lighting conditions when a photograph is made of an almost instantaneous event, as that moment of a horse race when the horses cross the finish line. Thus, it has been found that a skilled cameraman can more quickly adjust the iris aperture of the lens diaphragm by manually rotating the knurled peripheral knob 18 to vary the iris aperture if he is provided with an instantaneous visual indication of the light that is impinging upon and penetrating the film strip 38.

For this reason, the means operable in response to the light sensed by the photocell 56 is provided in the form of the meter 82. During the operation of the camera 10 the cameraman watches both the event being photographed and the meter 82. As the event draws close to the finish the camera 10 is focused on the finish line and therefore the photocell 56 reacts to the light it senses as the light penetrates the film strip. This, in turn, causes the meter 82 to operate. During its operation the indicator needle 90 of the meter will move along the indices depending upon the intensity of light sensed by the photocell.

If the meter face is calibrated with plus (+) and minus (−) indices on opposite sides of a zero (0) point of reference as illustrated in the drawing, the cameraman will know whether he must increase or decrease the iris aperture of the lens diaphragm. He can quickly accomplish this by rotating the adjustment portion 18 of the lens diaphragm. As he performs his lens adjustment the intensity of light penetrating the film strip changes accordingly and is sensed by the photocell 56 and responsively indicated on the meter. Thus, he can easily determine the extent and the effect of his rotative adjustment of the lens diaphragm by noting the movement of the needle 90 toward and away from the zero point of reference.

If, by any chance, the needle 90 is not adjusted to the zero point of reference on the meter 82 at the exact moment of the finish of the event, the cameraman has a visual indication available to him on the meter as to the exact extent of the additional negative or positive adjustment of the lens diaphragm that should have had at the moment of taking the picture to have placed the diaphragm at the zero point of reference. Consequently when later he develops the film he knows whether to develop it with more or less time than would have been required had the iris aperture been at the zero point of reference. In this manner, the cameraman always knows the precise extent of light impinging upon and actually penetrating the film strip.

Accordingly, if he had failed to manually adjust the iris aperture of the lens diaphragm to zero reference as indicated by the meter 82, at the moment of the finish of the event, he may then make appropriate adjustments in developing the film during the developing process. Therefore, what has been provided is an almost foolproof camera and method of operating the same to insure that the film in the camera is subjected to the maximum effective lighting conditions, and in the event the film is not so subject to the maximum effective light conditions at the essential moment of the event, the cameraman may then compensate for the variations in lighting conditions during subsequent development of the film. All of this is afforded by locating the light sensing photocell means 56 behind the film as it moves during the taking of the photograph, so it may sense and operate a responsive operating means in accordance with the light that actually impinges upon and penetrates the film to activate the same.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:
1. In a camera having a lens,
 a movable strip of film behind said lens and subjected to light passing through said lens, the invention comprising,
 means defining an exposure opening between the lens and the film strip to enable the film to be subjected to the light,
 light sensing means spaced from said exposure opening,
 and means to guide the strip of film for movement in the space between said exposure opening and said light sensing means to enable said light sensing means to sense the light passing through the film.
2. In a camera as in claim 1,
 said means defining said exposure opening being a plurality of blades positioned between the lens and the film strip,
 said blades being relatively adjustable to define said exposure opening and to vary the extent of the same and fixing the extent of said exposure opening when relatively adjusted.
3. In a camera as in claim 1,
 means on said camera connected with said light sensing means and being operable in response to the sensing of light passing through the film by the light sensing means to indicate the light passing through the film.
4. In a camera as in claim 3,
 said operable means being a measuring device having indices and an indicator operable in response to the light sensed by said light sensing means to move relative to said indices to thereby provide a visual indication of the light passing through the strip of the film.
5. In a camera as in claim 1,
 said film guide means having an aperture defined therein to enable light to pass thereinto after passing through the strip of film,
 and said light sensing means being positioned with respect to said aperture to sense the light passing through the strip of film.
6. In a camera as in claim 5,
 adjustment means on said guide means to enable adjustment of said light sensing means with respect to the strip of film.
7. In the method of operating a camera having a strip of film movable behind a lens diaphragm and an exposure opening, the invention comprising,
 positioning a light sensing means behind the strip of film and within the view of the exposure opening to sense the light passing through the exposure opening and the film,
 and connecting an operable means with the light sensing means to operate in response to the light sensed by the light sensing means,
 and the responsive operation of the operable means varying in accordance with the variations of light sensed by the light sensing means.
8. In the method of operating a camera as in claim 7, varying the exposure opening to vary the light passing to the strip of film from the lens diaphragm.
9. In the method of operating a camera as in claim 7, guiding the strip of film for movement between the exposure opening and the light sensing means so the light passing through the strip of film is diffused by the film and is sensed by the light sensing means.
10. In the method of operating a camera as in claim 9, adjusting the position of the light sensing means with respect to the strip of film to vary the sensitivity thereof to the light passing through the strip of film.

References Cited

UNITED STATES PATENTS

| | | |
|---|---|---|
| 3,077,401 | 2/1963 | Van Der Grinten et al. 355—68 XR |
| 2,893,300 | 7/1959 | Fajardo _____ 95—16 |
| 2,943,548 | 7/1960 | Thalhammer _____ 95—16 |
| 2,993,424 | 7/1961 | Koubek _____ 95—12.5 X |
| 3,078,758 | 2/1963 | Caldwell et al. _____ 95—16 X |
| 3,142,237 | 7/1964 | Waroux _____ 95—15 |
| 3,168,858 | 2/1965 | Campbell _____ 95—12.5 X |
| 3,191,182 | 6/1965 | Caldwell et al. _____ 95—16 X |
| 3,374,721 | 3/1968 | Van Praag _____ 95—15 |

NORTON ANSHER, Primary Examiner

RICHARD L. MOSES, Assistant Examiner

U.S. Cl. X.R.

95—12.5